United States Patent [19]

Passchier

[11] Patent Number: 4,918,788
[45] Date of Patent: Apr. 24, 1990

[54] PROCESS AND APPARATUS FOR RECOVERING MEAT FROM CARCASE SECTIONS IN PARTICULAR SEVERED ANIMAL HEADS

[76] Inventor: Bob Passchier, Earlspark, Loughrea, County Galway, Ireland

[21] Appl. No.: 297,260
[22] PCT Filed: Mar. 22, 1988
[86] PCT No.: PCT/NL88/00011
 § 371 Date: Nov. 23, 1988
 § 102(e) Date: Nov. 23, 1988
[87] PCT Pub. No.: WO88/07329
 PCT Pub. Date: Oct. 6, 1988

[30] Foreign Application Priority Data

Mar. 24, 1987 [IE] Ireland ................... 756/87

[51] Int. Cl.$^5$ ............................. A22C 25/16
[52] U.S. Cl. ............................. 17/46; 17/1 G; 17/50; 17/21
[58] Field of Search ............ 17/46, 52, 1 R, 1 G, 17/50, 23, 21

[56] References Cited

U.S. PATENT DOCUMENTS

| | | | |
|---|---|---|---|
| 2,953,240 | 9/1960 | Nigrelli | 198/179 |
| 3,982,299 | 9/1975 | Kompan | 17/1 R |
| 4,041,572 | 8/1977 | Martin et al. | 17/46 |
| 4,052,769 | 10/1977 | Thillet et al. | 17/23 |
| 4,237,580 | 12/1980 | Croasdell | 17/1 R |
| 4,385,419 | 5/1983 | Cantrell | 17/11 |
| 4,495,675 | 1/1985 | Hill | 17/1 G |
| 4,543,689 | 10/1985 | Couture | 17/1 R |
| 4,644,608 | 2/1987 | Martin | 17/46 |

FOREIGN PATENT DOCUMENTS

| | | |
|---|---|---|
| 0011563 | 5/1980 | European Pat. Off. . |
| 2394248 | 1/1979 | France . |
| 2581512 | 11/1986 | France . |
| 8501187 | 3/1985 | PCT Int'l Appl. . |

Primary Examiner—Willis Little
Attorney, Agent, or Firm—Dennison, Meserole, Pollack & Scheiner

[57] ABSTRACT

A continuous process for recovering meat from a plurality of carcase sections in particular severed animal heads (11) is provided, which comprises mounting the parts on a conveyor (1), advancing them past a number of work stations, at each of which either a manual operator (A-T) or an automatic tool partially dissects the carcase part (11), and recovering the separated meat.

Apparatus for performing the process is also provided, comprising a powered conveyor (1), means for securing carcase parts thereon, and at least one automatic tool which acts on the carcase parts, as they pass, by washing, scrubbing, incising, splitting, scraping, tearing, cutting or like procedures. The process divides the meat recovery process into several steps carried out in sequence along the conveyor (1). The process is more hygienic, less labour-intensive, and considerably more productive than conventional procedures.

25 Claims, 8 Drawing Sheets

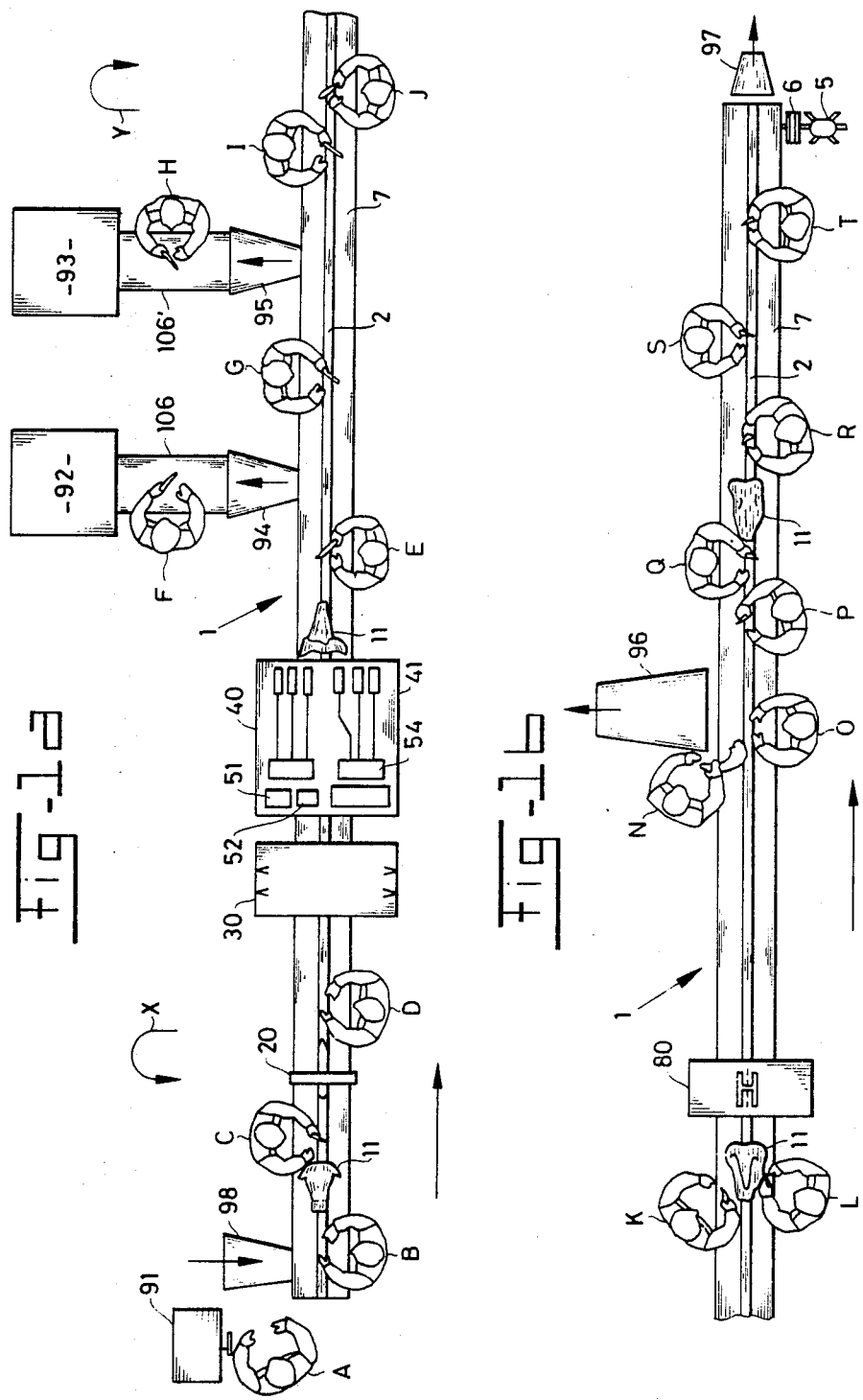

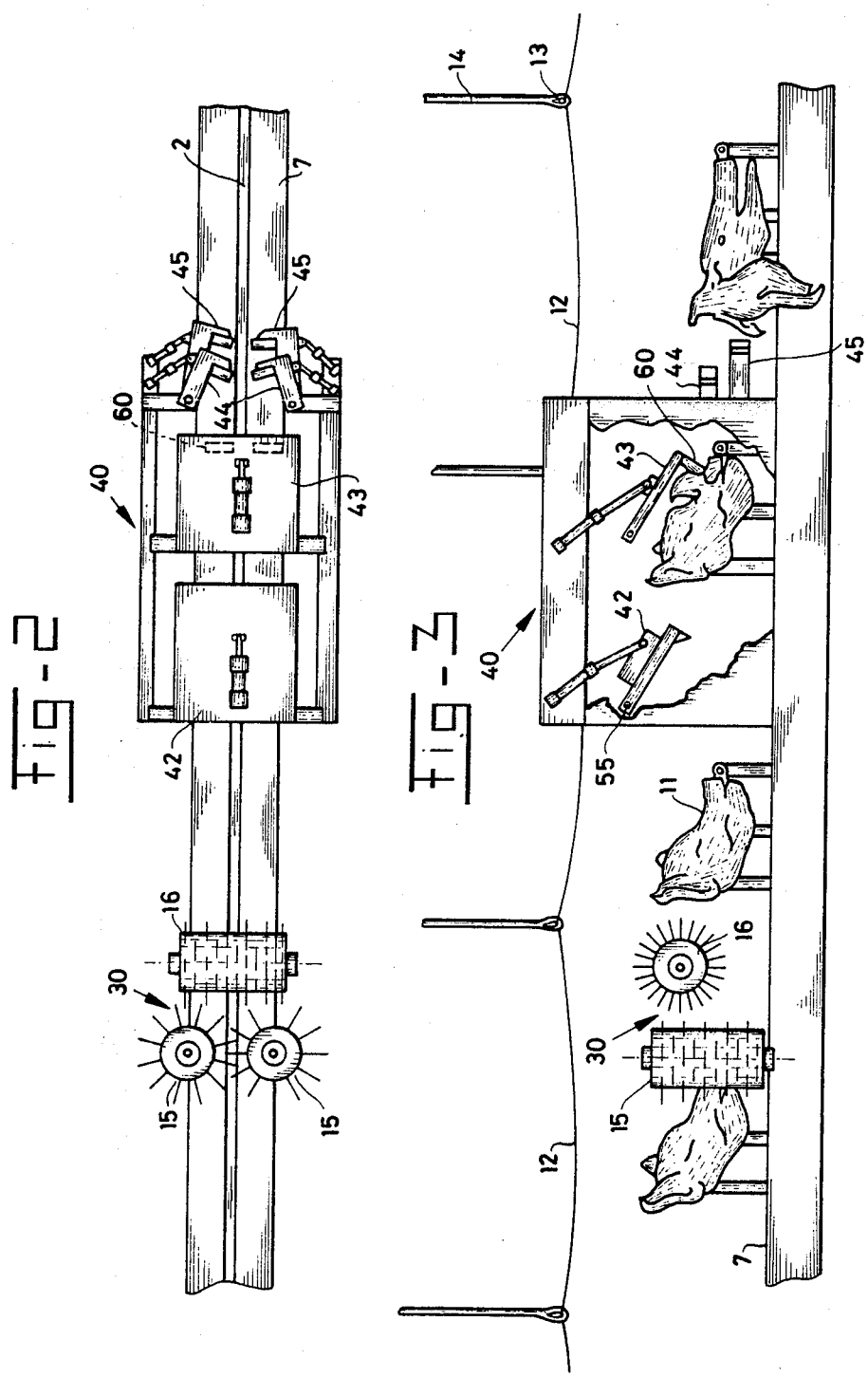

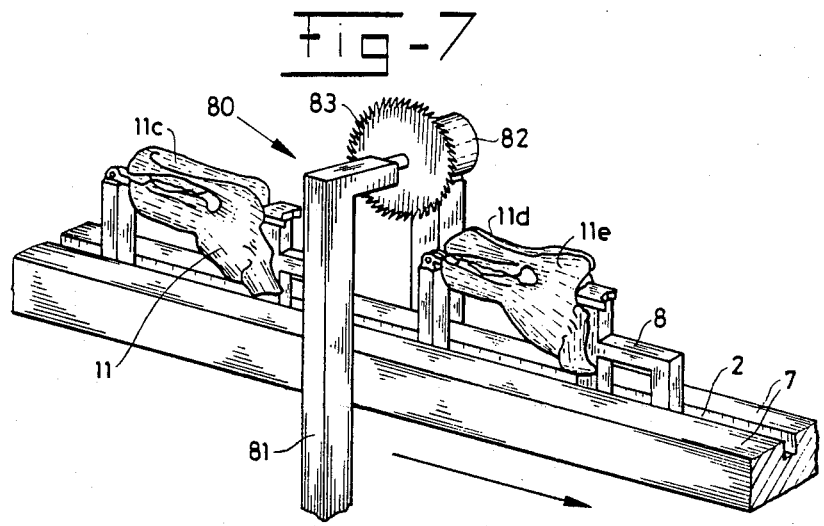
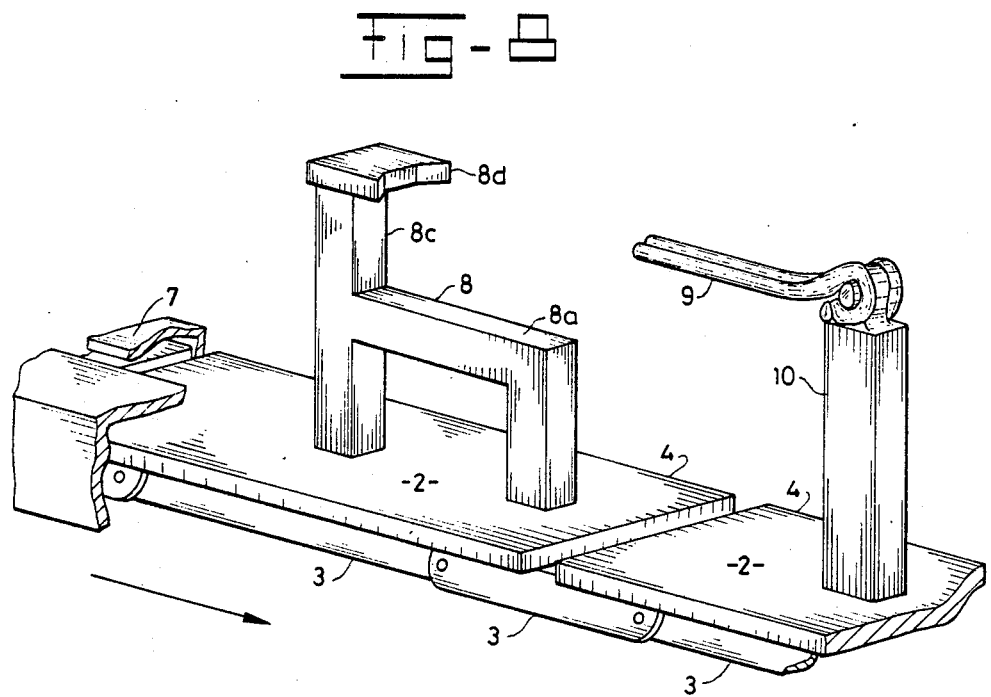

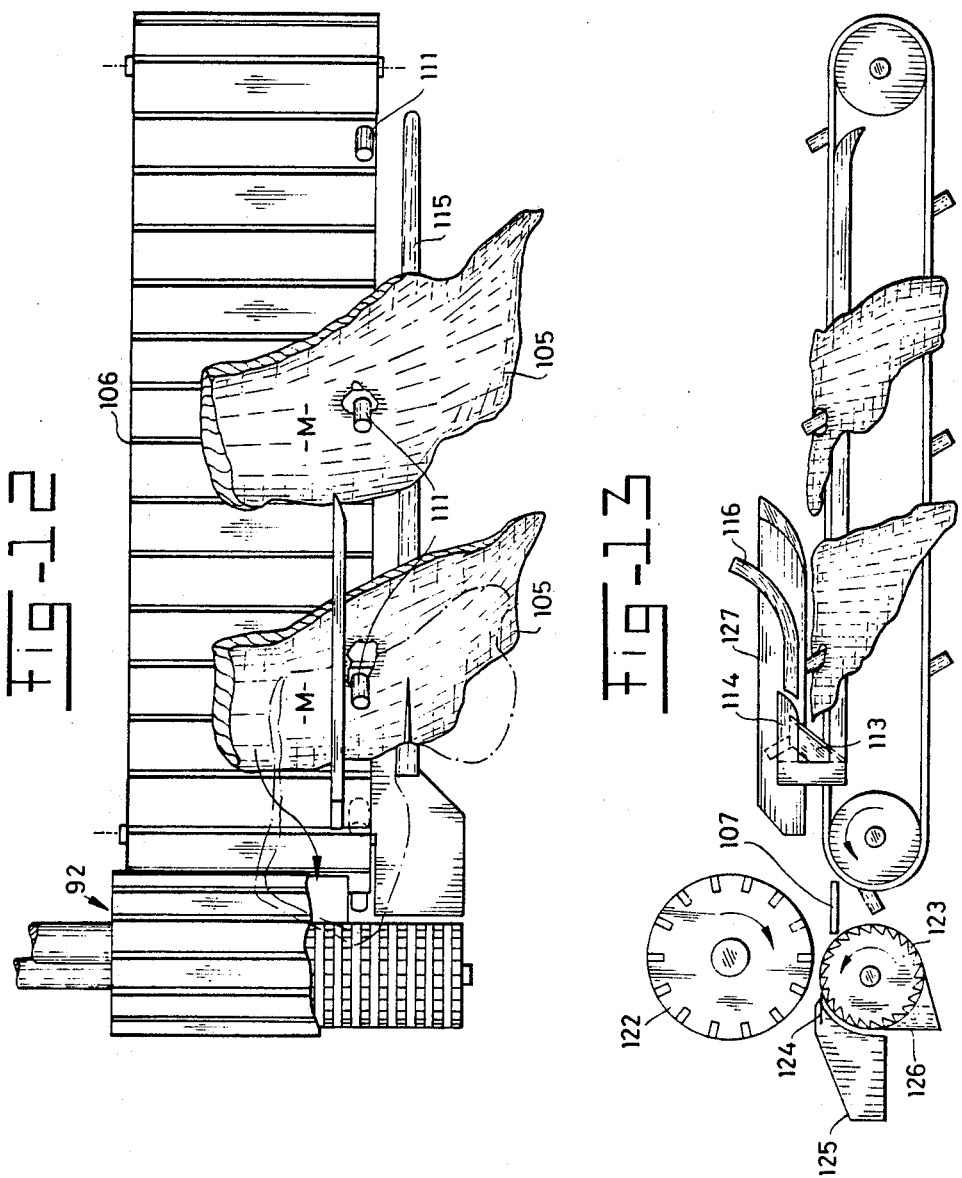

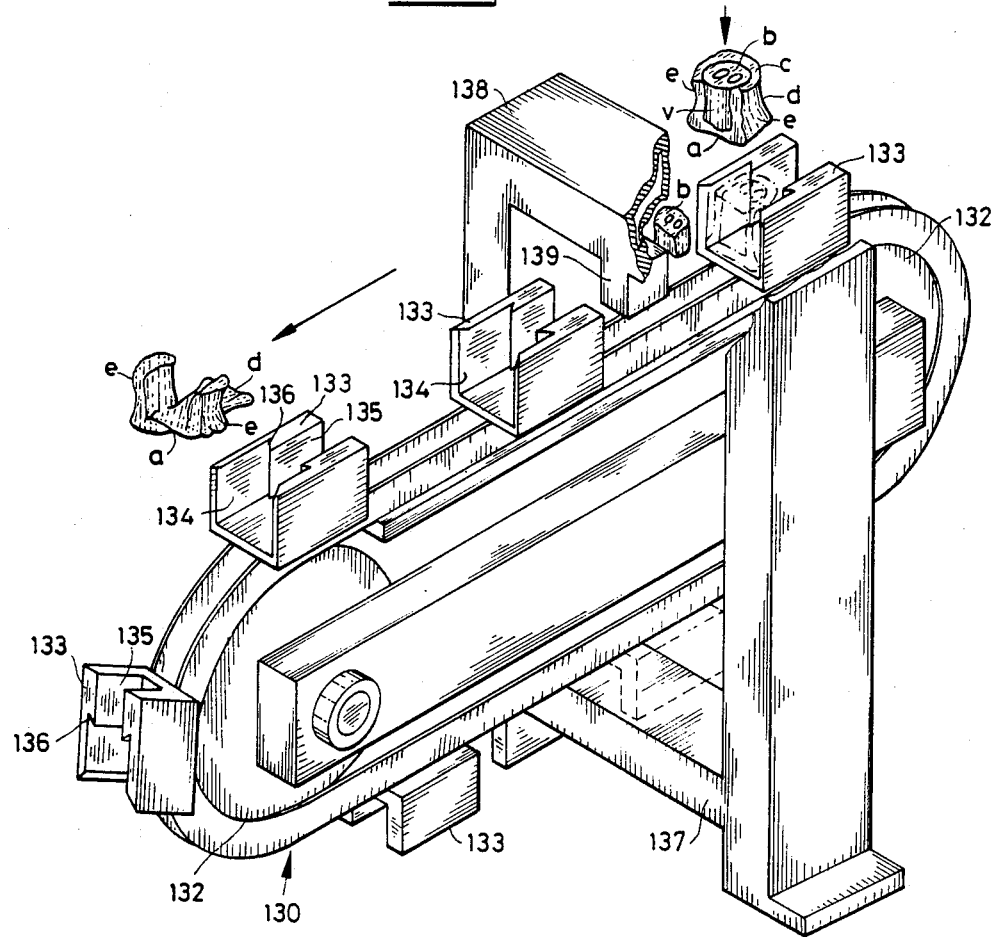
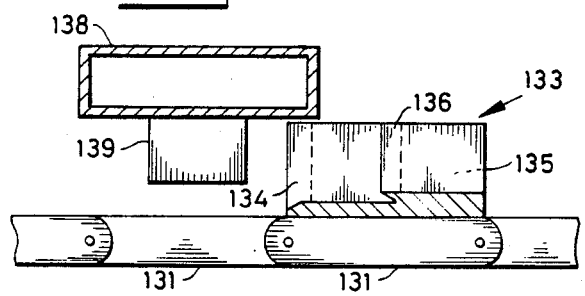

PROCESS AND APPARATUS FOR RECOVERING MEAT FROM CARCASE SECTIONS IN PARTICULAR SEVERED ANIMAL HEADS

This invention relates to improvements in meat recovery from carcase sections, a procedure which is also called deboning. It can be applied to carcase sections of any domestic animal that is slaughtered for meat on a substantial scale. Essentially, the invention is directed towards the provision of mass-production processes for deboning.

One traditional method of deboning centres around a production unit consisting of a single butcher with hand implements, such as knives, hacksaws and cleavers, who places one carcase section on his workbench and processes it from start to finish before proceeding to the next carcase section to be deboned. Another known deboning method is intermittent, and employs several butchers at a series of separate work stations, each butcher carrying out one of a succession of deboning steps on a given individual carcase section, whereupon powered mechanical means are used to convey the carcase sections to the next work station in the series, for the attention of the next butcher, or from the last butcher to a collection point.

These known methods require considerable manual skill and anatomical knowledge, are labour-intensive and have low output rates. Deboning has generally been thought ill-adapted to automation. Furthermore certain portions of meat are so small or so inaccessible that it has been uneconomic to pursue them heretofore, and they go to waste. Thus, having regard to the available sale price levels for meat on world markets, there is a long-felt need for speedier and more efficient deboning methods.

It is an object of the invention to provide a process and apparatus for deboning carcase sections continuously and with due regard for the safety and convenience of the operators. Another object is to divide the meat recovery process into discrete steps, providing appropriate equipment for the manual, semi-automatic or fully automatic execution of each step and arranging this equipment in operating sequence on a powered mechanical conveyor. A further object of the invention is to provide a hygienic process of deboning animal carcase sections which process reduces the amount of handling to which the sections are subjected and accordingly minimizes contamination of the meat, as determined by its bacterial count.

According to a first aspect of the invention there is provided a continuous process for recovering meat from a plurality of animal carcase sections of the same type and approximately the same size, which process comprises (a) mounting the carcase parts in sequence on a continuously moving powered conveyor, (b) advancing each mounted carcase section past a plurality of work stations, wherein a given work station may be attended by a manual operator or an automatic tool or a combination of both, (c) dissecting each moving carcase part in a succession of steps, one at each work station, to obtain progressive separation of the meat from the bones, and (d) recovering the separated meat.

The bones are preferably also recovered, separately from the meat, since they can be further processed to yield products of value such as bone meal.

Typical automatic tools for use in step (b) are splitting knives, incisor blades, circular saws, carcase section displacing members or cams, means for directing fluid jets under high pressure, and scraper blades. They are all mounted on substantially stationary anchorages above or to one or both sides of the conveying member. Some of them may be resiliently biased to accommodate differences in size of successive carcase parts on the conveyor, and to allow for the changing cross-sectional profile of the bony core of a carcase part as the conveyor carries it forward in contact with a tool which does not share in that motion. Resilient bias is, however, unnecessary in the case of splitting knives and impractical for circular saws.

The carcase parts, mounted on the conveyor, are preferably secured so that manual operators or automatic tools, especially scraper blades, may engage the soft tissues right down to the bone surface without displacing the bones with respect to the conveyor member. For this reason the conveyor member may be provided with abutment and/or clamping and/or piercing members for securing the carcase section and presenting it to the action of the manual operators or the automatic tools. Some at least of said members may be adapted for temporary release and/or repositioning between successive steps of the process of the invention, e.g. for altering the disposition of the carcase part as dissection thereof proceeds. For instance, a carcase part may at some stage need to be inverted and/or turned back to front during the process.

A preferred form of conveyor comprises an endless chain of linked plates entrained about terminal drive and idler wheels which are disposed in a vertical plane in use, whereby the plates combine to form a horizontal moving table with the abutment, clamping and piercing members upstanding thereon. Said members are preferably disposed on adjacent conveyor plates as cooperating pairs or sets, whereby each pair or set secures a carcase section between the members thereof. The spacing between the members of each pair is constant in the upper or horizontal portion of the conveyor, but necessarily increases on the pair's travelling round the terminal drive and idler wheels. This is where the carcase sections are fed on to one end and the stripped bones removed from the other end of the conveyor. Conveyor feeding is performed by hand, and bone removal is automatic, being effected at the appropriate stage either by baffle means or simply by gravity. Automatic feeding means are envisaged as a future development.

Ancillary automatic tools for the meat recovery process of the invention include cleaning devices such as rotary brushes and means for applying cleaning fluid to the carcase sections.

Some automatic tools used in the invented process may be mechanically displaceable (e.g. pivotable) into and out of a working position in which their presence is desired, for one reason or another, only in the presence of a carcase section. Such tools may be preceded in the conveying direction by carcase section sensors in servo relation to the tool displacing means. Sensors governing microswitches, for example, may be employed. This eliminates difficulties that may arise if the intended sequence of carcase parts, in operation of the process, happens to include occasional gaps. In a refinement of the provision, sensors may be arranged to respond to peculiarities of the carcase section which present in only one orientation thereof, so as to provide a check that a carcase section is correctly oriented on reaching a given automatic tool.

According to a second aspect, the invention provides apparatus for use in a continuous process of recovering meat from a plurality of animal carcase sections of the same type and approximately the same size, which apparatus comprises:

(a) a powered mechanical conveyor having a moving track consisting of discrete links, (b) means for mounting a carcase section on the conveyor track by the cooperation of two adjacent links or extensions thereof, and (c) at least one stationary automatic deboning tool mounted adjacent the conveyor track and adapted to engage the advancing carcase sections in succession, (d) each said tool being adapted to effect one stage of dissection of the carcase part.

Preferably the free conveyor space between successive automatic tools along the conveyor is sufficient to accomodate manual workers wherever necessary.

While the invention is conceived in terms broad enough to include the deboning of carcase sections taken from all parts of an animal, the invention is preferably applied to perhaps the most difficult part, namely the head, in particular swine heads.

In the following description, terms of orientation such as right and left, upper and lower, forward and backward etc, are to be referred to a notional pig standing normally on horizontal ground, except where a different intention is evident from the context.

According to a further aspect of the invention, a process is provided wherein each mask is separated from the associated eye socket region of the desnouted skull by the application of a rotating tubular cutter concentrically with the eyeball, and the thus treated head is passed through the scraping tool group which removes the flesh from the skull as left and right masks, still attached to the skull at the ear region, each mask having a standardized circular perforation around the eye region, without attachment of eyeball or other viscera.

Prior to the devising of this aspect of the invention the eyeball, optic nerve and adjacent tissues tended to come away with the mask when the latter was separated from the skull. The mask was then severed from the attached eyeball and other viscera by manual knifework, leaving a large, jagged, non-standard and wasteful hole in the mask. Furthermore the new, standardized circular perforation has a use, as will appear.

If necessary each mask, after complete removal from the skull (together with an ear) is bisected by manually drawing it past an immobile, inclined knife blade along a locus extending approximately from midway along the upper lip to just below the ear, thereby converting the mask into an upper and a lower semi-mask, both of which are placed, rind-side in contact, onto a flat or table-like conveyor which feeds them to a rotary de-rinding machine, the upper semi-mask being placed so as (after removal of the ear) to be fed forwardly to the de-rinder, and the lower semi-mask being placed so as to be fed to the de-rinder rear end first.

It is found in practice that the semi-masks are most efficiently processed by a rotary de-rinder when presented thereto by way of a leading edge with a substantial thickness of meat underlying the rind. Such a thickness of meat underlies the rind across the forward end of the upper semi-mask, and across the rear end of the lower semi-mask; hence the above-recited de-rinder feeding procedure according to the second aspect of the invention.

According to a still further aspect of the invention, a process is proposed wherein an upper semi-mask perforated in accordance with the above-recited aspect, and placed on a conveyor, is disposed on an edge region of the conveyor by threading the perforation over a tractor pin which projects from the moving surface of the conveyor, whereby the attached ear hangs over the conveyor edge, or is constrained by stationary guide means so to hang, and the moving upper semi-mask encounters a stationary knife provided adjacent the conveyor edge and opposed to the conveying direction, which knife edge is effective to sever the ear from the semi-mask before the latter reaches the de-rinder.

The eye-region perforation provides a useful anchorage whereby the tractor pin, urged by the conveyor on which it is mounted, can apply sufficient tractive force to the upper semi-mask to sever the ear therefrom, since the ordinary friction between the conveyor surface and the semi-mask would be sufficient for that purpose.

Moreover, the invention provides a process wherein either the entire mask (right or left) or the upper semi-mask following bisection, is threaded onto a tractor pin as described above, is draped transversely over an edge region of the conveyor with the ear extending outside said edge region, is advanced against a stationary knife as described above, and is turned to face the derinder with its forward edge by virtue of the couple exerted by the tractor pin and the knife while the ear is being severed.

The present invention is also directed to the deboning of discrete, severed, swine snouts and seeks to make possible their rapid, repetitive deboning on a mass production scale.

The invention accordingly provides an apparatus for deboning discrete, severed swine snouts which apparatus comprises an immovable barrier member and means for advancing the snout against the barrier member, the barrier member being adapted to encounter and immobilize the bone with respect to the advancing means, and the advancing means being adapted to displace the meat forward of an separate it from the immobilized bone, while clearing the obstruction presented by the barrier member.

In a preferred embodiment, this aspect of the invention provides apparatus for deboning discrete, severed swine snouts, which apparatus comprises means for receiving a severed swine snout by engagement of the anterior and lateral aspects without obstruction of the cut surface or of the dorsal or ventral aspects thereof, means for conveying the thus engaged snout in a direction and along a line extending from the dorsal surface to the ventral surface, and an immovable barrier member disposed along said line in the part of the advancing snout, the the conveying force being sufficient to drive the fleshy parts of the snout onward leaving the bone immobilized behind the barrier member, the barrier member being so disposed and dimensioned as to pass clearly through the snout receiving and conveying means without fouling.

The snout receiving means is preferably a receptacle of U-channel cross-section open to both ends (leading end and trailing end) wherein the trailing end has a reduced cross-section. More preferably, the transition between the greater and the latter cross section is marked by a step having a sharp forwardly-directed edge. The step serves to retain the snout against backward displacement thereof as a whole. The sharp edge serves to facilitate the splitting-off of the dorsal meat as a flap when the bone is urged backward through it by the barrier member, and thus helps to free the bone from the snout.

The snout conveying means is preferably a powered endless conveyor having a plurality of the above-mentioned receptacles securely mounted on it, spaced apart in the conveying direction and with their channel mid-axes aligned on a common conveying locus.

Each snout fits into a respective receptacle with the dorsal and ventral surfaces exposed fore and aft respectively, and with the cut surface exposed across the open or top aspect of the U-channel.

The immovable barrier member is preferably an elongate parallelepipedal block mounted on a sturdy and secure anchorage and disposed with its main axis in line with the aforementioned conveying locus, its cross-section being similar to the U-section of the receptacles, leaving a clearance for the meat to slide forward past it while the bone becomes dislodged and remains behind it. The means for mounting the block is of course such as to avoid fouling the receptacles in their course.

In an aspect thereof the invention provides a method for deboning discrete, severed swine snouts which method comprises advancing each snout against an immovable barrier member adapted to encounter an immobilize the bone with respect to the advancing means, whereby the meat is displaced forward of and separated from the immobilized bone, while clearing the barrier member.

In a preferred embodiment, the second aspect of the invention provides a method for deboning discrete, severed swine snouts which method comprises receiving a severed swine snout by engagement of the anterior and lateral aspects without obstruction of the cut surface or of the dorsal or ventral aspects thereof, conveying the thus engaged snout in a direction and along a line extending from the dorsal surface to the ventral surface, advancing the snout against a stationary barrier member disposed in its path, with a conveying force sufficient to drive the fleshy parts of the snout onward leaving the bone immobilized behind the barrier member, and without fouling the means for receiving and conveying the snout.

A preferred embodiment of the invention dedicated to the deboning of swine heads will now be described by way of non-limiting example with reference to the accompanying highly schematic drawings, in which:

FIG. 1a is a plan view of the upstream half of a conveyor in use in a process for deboning swine heads.

FIG. 1b is a plan view of the downstream half of the conveyor of FIG. 1a,

Figure 4:
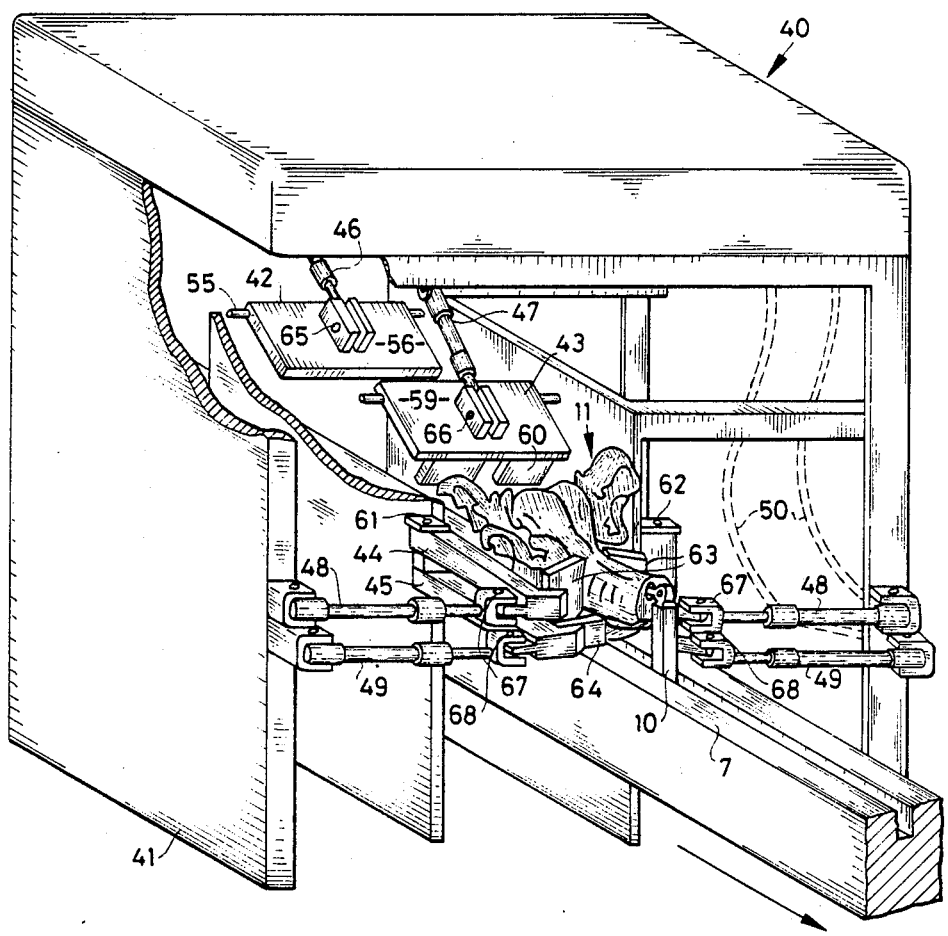
Figure 5:
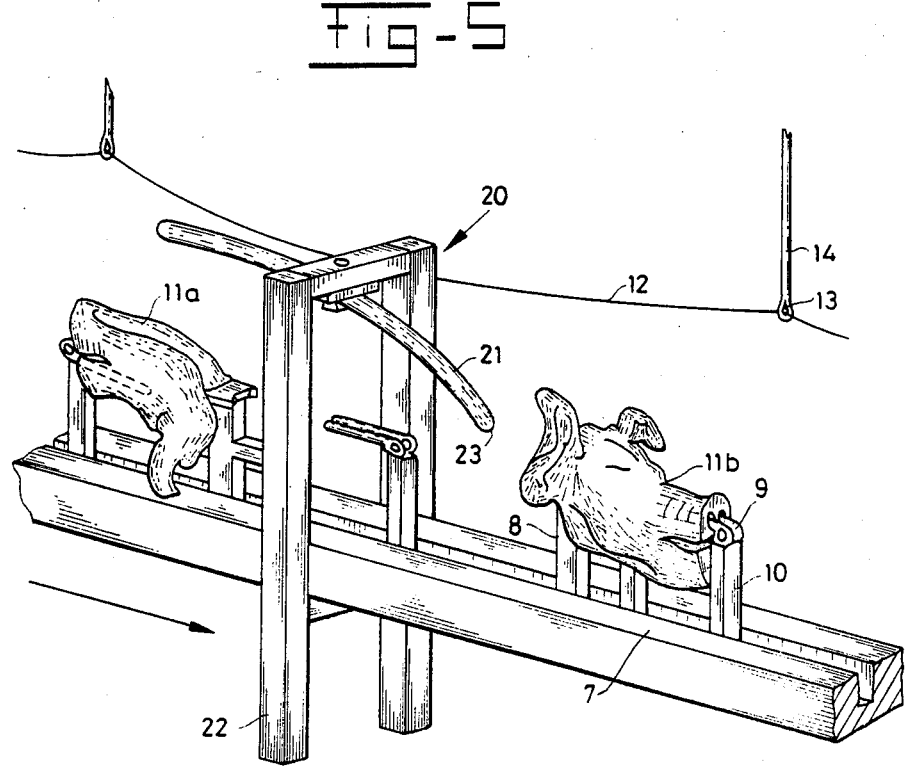
Figure 6:
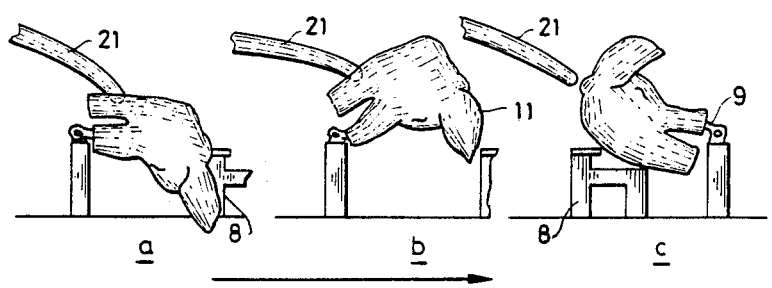

FIG. 2 is a plan view of an upstream portion of the conveyor of FIG. 1, showing a first two groups of automatic fools, FIG. 3 is a side elevation of the conveyor portion of FIG. 2, FIG. 4 is a perspective view, on a larger scale an partly cut away, of the deboning tool group seen to the right in FIGS. 2 and 3, FIG. 5 is a perspective view, on the scale of FIG. 4, of a pig's head inverting tool and associated parts of the conveyor, FIG. 6 is a diagrammatic illustration of the mode of operation of the tool of FIG. 5, FIG. 7 is a perspective view of a bonecutting circular saw and associated parts of the conveyor, FIG. 8 is a perspective view of a detail of the conveyor, with the cover table partly cut away, and showing the pig's head mounting members.

Figure 9:
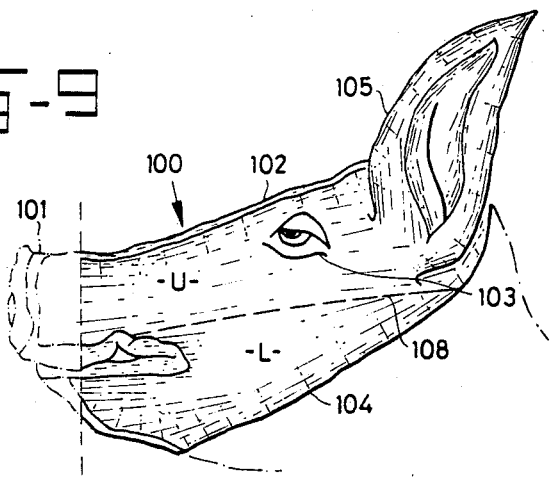
Figure 10:
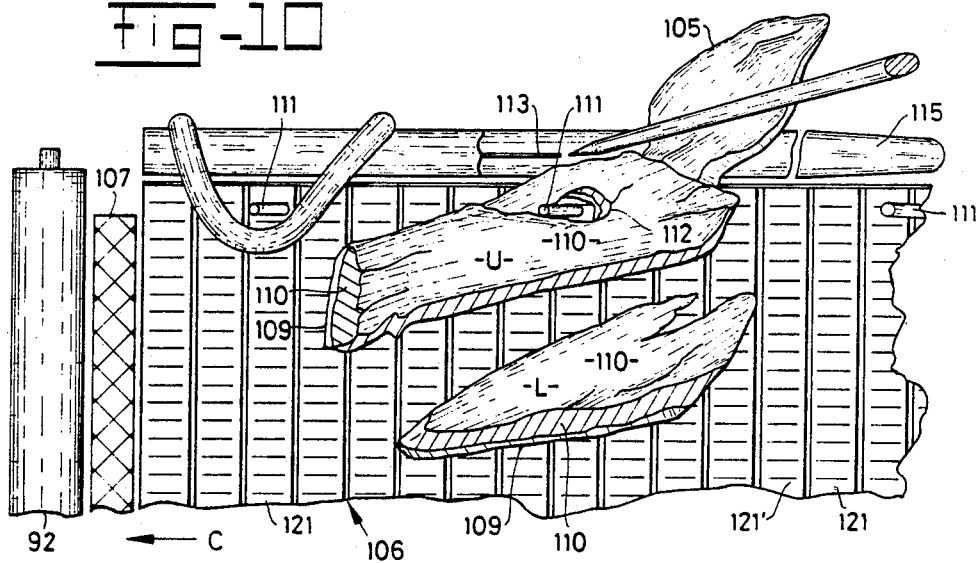
Figure 11:
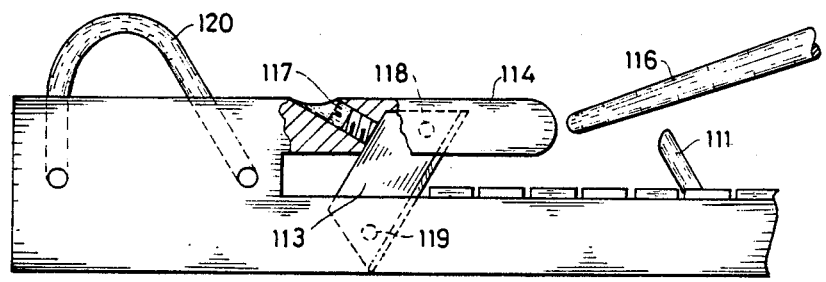

FIG. 9 is a side elevation of a swine head, with outline indication of the upper and lower semi-masks of one side (the left side) thereof;

FIG. 10 is a partly cut-away plan view of a flat conveyor leading up to a de-rinding machine, showing one upper and one lower swine head semi-mask disposed thereon;

FIG. 11 is a side elevation or a stationary knife assembly being a detail from the top mid-part of FIG. 10;

FIG. 12 is a plan view of a flat conveyor similar to the conveyor of FIGS. 10 and 11, showing two sine head full masks thereon;

FIG. 13 is a schematic side elevation of the conveyor of FIG. 12;

FIG. 14 is an isometric view of apparatus for deboning discrete, severed swine snouts, the apparatus being partly cut away, and FIG. 15 is a side sectional elevation of a detail of the apparatus of FIG. 14, viewed across the conveyor from left to right as seen in that figure and taken in a vertical plane coincident with the near face of the barrier block shown in that figure.

Referring now to the drawings, a conveyor 1 comprises an endless chain 2 of driveable stainless steel links 3 (FIG. 8), entrained around a vertically disposed drive sprocket at one end and an idler sprocket at the other end. Drive means includes a motor 5 and gearbox 6 (FIG. 1b). Sprockets, switchgear and controls are conventional and are not illustrated.

Each second or alternate link 3 is integral with a respective rectangular stainless steel plate 4. The plates line up, in the upper section of the conveyor in use, to yield the endless chain 2 in the form of a substantially unbroken moving platform.

Lengths of L-section stainless steel overlap the moving edges of the chain 2, serve as guards for the workers and provide a fixed table 7 to work at. The table 7 and the conveyor 1 are mounted on a floor-supported framework (not illustrated) which is conventional, and which also supports the various automatic tools.

Each pair of adjacent plates 4 (FIG. 8) bears pig's head supporting means which comprise a chair 8 welded to one member of the pair and a pair of locating rods 9 swivelably mounted on an upstanding pillar 10 welded to the other member. The rods 9 having one rest position pointing upstream and another pointing downstream of the conveying direction, so that a pig's head positioned thereon can be inverted by pivoting to face in either direction.

Referring now to FIG. 1a and 1b, the conveyor 1 is provided with automatic tools mounted on its framework and disposed as follows in the conveying direction:

a pig's head inverter 20,
a washing unit 30,
an incising and deboning tool group 40, and
a bonecutting circular saw 80, all of which are described in more detail below. Ancillary equipment includes a circular saw 91 for snout removal,
two de-rinding machine 92, 93 with respective feed tables 94, 95.

A second, recovery conveyor located below floor level and conveying in the opposite direction to the conveyor 1. This second conveyor is not illustrated.

Feed chutes, likewise not illustrated, are provided wherever necessary for feeding the recovered meat from the first to the second conveyor.

During performance of the process according to the invention, manual workers A–T are engaged at the workbench 7 to carry out intermediate process steps for which automatic tools have not, or not yet, been devised. The workpieces on which the process operated are pigs' heads 11 from which the snouts have been removed for a length of 5–10 cm by such means as the circular saw 91. A safety cable 12 (FIGS. 3 and 5) freely supported in loops 13 on rods 14 depending from a ceiling or other overhead support above the workbench 7, extends at approximately the eye level of the workers for the entire length of the conveyor 1 and is connected to a microswitch (not shown) to shut down the conveyor on being pulled or pushed.

Referring now to FIGS. 2 and 3, the washing and scrubbing unit 30 comprises three powered cylindrical rotary brushes, the spindles of which are movable normally to their respective axes and are elastically biased towards the locus of advance of the pigs' heads 11. The brushes comprise two vertically disposed rotary brushes 15 and one horizontal rotary brush 16. The unit 30 also comprises means (not shown) for directing several jets of rinsing water at each advancing pig's head 11.

However, preferably a high pressure water cleaning unit is used instead of the unit 30 shown in FIGS. 2 and 3.

The incising and deboning tool group 40 (FIGS. 2, 3 and 4) comprises a box framework 41 and, pivotally mounted therein, an incisor 42, a brow scraper 43, a pair of cheek scrapers 44 and a pair of jaw scrapers 45, operable respectively by fluid pressure-driven cylinders 46, 47, 48 and 49. The pressure fluid leads, which are represented in FIG. 4 only by a specimen pair 50 shown in broken outline, are fed (FIG. 1a) by a motor and compressor 51 from a fluid reservoir 52.

A bank of solenoid-operated valves 54 actuated by microswitches (not shown) in response to sensors (not shown) disposed in the expected path of an advancing pigs' head governs the operation of the cylinders and completes the tool group 40. These operating and control elements 51–54 are housed on the top of the framework 41, shown in FIG. 1a, and have been omitted from FIG. 4.

The incisor 42 is mounted on a horizontal spindle 55 journalled in the framework 41, and comprises a plate mounting 56 having a downwardly directed incisor blade 57 detachably secured to its underside. The blade 57 extends in the vertical plane that contains the conveyor mid-axis.

The brow scraper 43 is likewise mounted on a horizontal spindle 58 journalled in the framework 41, and comprises a plate mounting 59 having a pair of downwardly directed brow scraper blades 60 detachably secured to its forward edge, perpendicular to the vertical plane that contains the conveyor mid-axis, and with the members of the pair disposed symmetrically about said axis. The incisor 42 and the brow scraper 43 are arranged to pivot about respective horizontal axes, those of the respective spindles 55 and 58, under the action of the respective fluid pressure-driven cylinders 46 and 47.

The cheek scrapers 48 and jaw scrapers 49 are journalled in the framework 41 by means of vertical pivot pairs 61, 62, and carry respective pairs of scraper blades 63, 64 angled towards the aforementioned vertical plane that contains the conveyor mid-axis.

The deboning tools 42, 43, 44, 45 are pivotally secured to their respective fluid pressure-driven cylinders by respective pins 65, 66 and pin pairs 67, 68, and the cylinders are themselves pivotally mounted on the framework 41 in a similar manner.

The applied fluid pressure in each cylinder in use is substantially constant, but their arrangement imparts a resilience to the tools 42, 43, 44, 45 in action against an advancing pig's head, to compensate for alterations in the cross-sectional profile of the bony structure of the skull in contact with each said tool as the pig's head advances past the tools.

Referring now to FIGS. 5 and 6, the pig's head inverter 20 comprises a downwardly inclined rod 21 rigidly mounted in a sturdy framework 22 secured to the conveyor framework. The rod points down at the mid-axis of the conveyor, and its lower end portion 23 is located so as to intercept medially the rear aspect of the front curved portion of the lower mandible of a pig's head 11a presented upside down and moving backwards. The encounter results in the head 11a somersaulting about the pivotal mounting of the associated locating rods 9, and passing through the orientations shown in FIGS. 6 a, b and c to end in the attitude of the head 11b in FIG. 5. It will be noted that the head 11b, in contrast to 11a, is erect and facing forward in the conveying direction.

Referring to FIG. 7, the bonecutting circular saw 80, from which the saw guard has been removed in the drawing, is stationary and mounted on a frame 81 secured to the conveyor framework, and comprises a drive motor 82 and a saw blade 83. The height above the conveyor track 2 of the lower limb of the blade 83 is such as to cut the lower mandible into left and right halves 11d, 11e in an advancing pig's head 11c inverted and facing upstream of the conveyor as shown.

Referring now to FIG. 8, the chair 8 comprises an upright back member 8c having two prongs 8d directed downstream of the conveyor to enhance the clamping action exerted by said back member 8c on the pig's head against the resistance of the locating rods 9.

The performance of the method of the invention, and the use of the apparatus of the invention, will now be briefly described with reference to the drawings, and in particular to FIGS. 1a and 1b. The conveying direction is indicated by a straight arrow in each figure of the drawings.

Operator A removes a pig's head from a supply crate (not shown) presents it to the circular saw 91 and removes about 7 cm length of the snout, which is collected in an underneath vessel for later treatment. He then places the desnouted pig's head on the chute 98. Operator B places desnouted heads 11 from chute 98 onto the downstream end of the conveyor 1 in the clamp formed by the extensions 8, 9 of two adjacent links 3 of the conveyor chain 2, while they pass around the terminal sprocket. The head is disposed upside down and faces downstream of the conveyor (i.e. in the conveying direction, see the position of head 11a in FIG. 5).

Operator C, using a butcher's knife, makes a preliminary cut in the chin of the head, to facilitate the subsequent operation of the deboning tool group 40.

Operator C also removes the tongue (if still present: heads are sometimes supplied with the tongue removed).

The advancing head then intercepts the inverter 20, and adopts the upright, forward-facing position of head 11b in FIG. 5 as a result, pivoting as shown by the arrow X.

Operator D circumcises the eyes with a hand-held power driven tubular knife.

The head then passes through the high pressure water cleaning unit or the washing and scrubbing unit 30, parting the resiliently mounted brushes 15 and raising brush 16 sufficiently to proceed, while being thoroughly rinsed and brushed, and advances to enter the tool group 40.

In the tool group 40, the incisor blade 57 (FIG. 4), actuated by a sensor and microswitch (not shown) in response to the presence of the head, descends to incise the flesh down to the bone along a median dorsal line 12 from the snout stump to behind the ears, in preparation for the separation of the flesh into two discrete masks, left and right.

The brow scraper 43, similarly actuated, descends to intercept the snout meat and scrape it back towards the brows, in right and left strips.

The cheek scrapers 44, similarly actuated, close laterally upon the snout stump and drag the flesh back, supported a short time later by similar action on the part of the jaw scrapers 45. The head emerges from the tool group 40 with the right and left masks clearly separated from the skull from the snout stump back to the ears, where the masks remain attached.

Operators E and G, each attending each head, further loosen the eye meat and back meat, cut the left and right masks free and place them on the chutes or tables 94, 95 from which they are fed to the de-rinding machines 92, 93 by the oeprators F and H, as will be explained in more detail hereafter.

The head is then manually re-inverted by pivoting in the direction shown by the arrow Y, to assume once again the attitude shown at 11a in FIG. 5.

Operators I-L, using hand-held spikes and knives, effect further meat releasing cuts, etc.

The head now advances to the bonecutting saw 80, which divides the lower jawbone into right and left halves as previously described.

Operators N and O further free the skull, and especially the lower mandible halves, from attached meat, extract the lower mandible halves, and place them in the chute 96 to land on a separate bone and waste conveyor (not shown) for collection.

Operators P-T manually scavenge the remaining accessible meat from the residual upper mandible and cranium, including the masseter (cheek) muscle and the throat meat.

The stripped skull residue is discarded automatically under gravity into chute 97 at the end of the conveyor run. From there it empties to the aforesaid bone and waste conveyor which is not illustrated.

Referring now to FIGS. 9-13, a swine head 100 is preprocessed by sawing off the snout 101, incising the dorsal midline 102 from snout stump to crown, to the depth of the soft tissue, circumcising the eye 103 with a hand-held power-driven rotary tubular knife, down to the bone, cutting below the lower jaw around the line 104, stripping the right and left masks back from the snout stump to behind the ear 105, and removing the stripped masks with a knife.

The chain conveyor 106 is powered for forwarding in the direction of the arrow C in FIG. 2, to the conventional rotary de-rinding machine 92 via a narrow transition table 107. Two sets, each consisting of a conveyor 106, 106' and a de-rinder 92, 93 are used, one set for forwarding the left mask (in two pieces) to the de-rinder and de-rinding it, and the other set for forwarding and de-rinding the right mask similarly.

To one side of each conveyor 106 is located a separate cutting table (not illustrated) equipped with a stationary, rigid splitting knife having its blade upstanding from the table surface. A respective operator F, H attends each said table, to which the right and left masks respectively are fed following their separation from the head, and prior to their delivery to one of the conveyors 106, 106'.

The operator grasps the left mask, applies it to the splitting knife (whose cutting edge faces away from hin) and draws it past the knife to bisect it along the line 108 thus producing upper and lower left semi-masks U and L respectively. The semi-masks are then placed on the conveyor as shown in FIG. 10. It will be seen that the ring 109 is lowermost, the meat 110 being out of contact with the conveyor. The meat 110 is of adequate de-rinder feeding thickness across the leading edge of each semi-mask in the position used and illustrated. In particular, the conveyor chain comprises a succession of laterally located, upstanding tractor pins 111 spaced apart along each of its two long edges. The upper semi-mask U is now located on a tractor pin 111 with said pin occupying the perforation 112 (in the meat) that represents the former position of the eye.

An ear knife 113 is mounted with its cutting edge facing out between steel guide rods 114, 115 mounted beside the conveyor 106. A supplementary guide rod 116 is disposed with its tip directed at the tip of the guide rod 114 and its shank sloping gently upward and outward from the conveying direction indicated by the arrow C. The combined action of the guide rods ensures that the upper semi-mask U to which one ear 105 remains attached has the attachment region thereof presented to the ear knife 113. The tractor pin 111 moving with the conveyor 106 is effective to draw the semi-mask U past the ear knife 113 and to sever the ear 105, which drops into a first ear collecting tube (not shown) standing on the floor. A second ear collecting tub stands similarly beside and below the second conveyor 106', and collects the successively severed ears from the (right) masks in this continuous process. The blade of the ear knife 113 is provided with an adjusting screw 117 and lock screws 118, 119, all engaged in threaded bores in the guide rods 114, 115.

Mounted beside the conveyor, a curved stationary steel wire 120 overlaps the conveyor edge and is shaped into a cam for disengagement of the upper semi-mask U from the tractor pins 111 in succession. Each upper semi-mask U thus proceeds unencumbered to its destination between the rollers of the de-rinder 92, 93. It will be noted that the transition table 107 is shorter than the width of the conveyor by a distance (at each of its ends) sufficient to permit free revolution of the tractor pins 111 despite their projection above the conveying surface of the conveyor 106.

The conveying surface conveniently comprises plastics strips 121, each of which extends in length to the full width of the conveyor 106 and is articulated to adjacent strips 121 in the manner of a piano hinge, the exposed or bearing surface of each strip 221 bearing a plurality of parallel ribs 121' which extend in the conveying direction.

Referring now specifically to FIGS. 12 and 13, in which the elements corresponding to those of FIGS. 10 and 11 have been given the same reference numerals, a conveyor 106 cooperates with a de-rinding machine 92, has upstanding lateral tractor pins 111, an ear knife 113, guide members 114, 115 and a supplementary guide member 116. The de-rinder 92 comprises a transition table 107, an upper roller 122, a lower roller 123, a de-rinding blade 124, a meat delivery guide plate 125 and a rind delivery guide plate 126. The associated arrows show the working directions of rotation of the rollers, including the conveyor rollers.

The embodiment of FIGS. 12 and 13 differs from that of FIGS. 10 and 11 in having a curved-nose ear guiding plate 127 for guiding and constraining the swine ears into the gap between guide rods 115 and 114/116, so as to present them in a uniform manner to the ear knife 113.

In use, the swine head masks M are placed on the conveyor 106, each located on a respective tractor pin 111, in the attitude or disposition shown in full outline in FIG. 12. The combined action of the tractor pin 111 and the ear knife 113 on a given swine mask M, in addition to severing the ear 105, applies a couple to the mask whereby after removal of the ear, the remainder to the mask has rotated into the attitude or disposition shown in broken outline in FIG. 12.

It will be appreciated that this presents the forward or leading edge of the mask to the de-rinder, this being where the meat is thickest.

Referring now to FIGS. 14 and 15, apparatus for deboning discrete, severed swine snouts comprises an endless chain conveyor 130 comprising links 131 entrained around terminal sprockets 132 one of which is driven by a power source which is not illustrated. Swine snout receptacles 133 of stainless steel are firmly secured to respective links 131. Each receptacle 133 is of a rectangular U-shaped cross-section, the dimensions of which are greater at the forward end 134 and reduced at the rear end 135, the transition between the two cross-sections being marked by a step with a forwardly-directed edge 136. The edge 136 follows the three limbs of the rectangular U-shaped cross-section.

A sturdy framework 137 straddles the conveyor 130 and comprises a bridge 138 from which a barrier block 139 depends centrally. The block 139, although disposed directly in the path of the advancing receptacles 133, offers no obstruction to their passage, and in fact is a fairly close fit in the portion 135 of reduced cross-section of each of the receptacles 133. The barrier block 139 is also of stainless steel.

The described apparatus is intended for use in a method of deboning a succession of discrete, severed swine snouts 140, each of which has an anterior surface a, and enclosed plug of bone b, a cut surface c, a dorsal surface d, two lateral surfaced l and a ventral surface v.

In use of the apparatus, a respective snout 140 is manually fed into each receptacle 133 at a feed end F of the conveyor 130, being inserted into the larger cross-sectional end opening of the receptacle in a direction opposite to the conveying direction.

As the links 131 with receptacles 133 advance, each snout 140 comes, in its turn, into contact with the barrier block 139 which then retains and immobilizes the bone plug b while the receptacle 133 continues in its path. The step 136 with its sharp edges ensure that the snout 140 is retained in its position, and contributes to the rupture of the rind which converts the dorsal meat d into a flap. The flap opens, allowing the bone plug b to escape while the remaining meat of the snout 140 continues towards the discharge end of the conveyor. The bone plug b falls downward onto a deflector (not shown) which guides it into a collecting vessel.

The snout meat is removed in turn from each of the receptacles 133 manually at present, but automatic means for doing this is in course of development. The meat is accumulated on a tray to one side of the conveyor. The leaded trays are periodically removed for further processing of the meat, and replaced with fresh trays. This deboning method according to the invention is many times faster and substantially more efficient than previous methods, all of which were purely manual.

I claim:

1. A continuous process for recovering meat from a plurality of animal carcass sections of the same type and approximately the same size in particular severed animal heads, which process comprises
   (a) mounting the carcass parts in sequence on a continuously moving powered conveyor, by securing each part at one of its sides to one of a plurality of pivotally mounted locating members, the part resting at its other side on one of a plurality of supporting members so that by pivoting the part secured to said locating member said part can be turned upside down in which position it rests at its other end on a trailing or leading supporting member;
   (b) advancing each mounted carcass section past a plurality of work stations, wherein a given work station may be attended by a manual operator or an automatic tool or a combination of both;
   (c) dissecting each moving carcass part in a succession of steps, one at each work station, to obtain progressive separation of the meat from the bones; and,
   (d) recovering the separated meat.

2. A process as claimed in claim 1 wherein before securing an animal head on a locating member, a front portion of the snout is removed.

3. A process as claimed in claim 1 wherein the additional step of circumcising the eyes is accomplished.

4. A process as claimed in claim 1, which includes recovering the separated bones.

5. A process as claimed in claim 1, wherein at least one automatic dissecting tool is mounted on a substantially stationary anchorage adjacent the conveyor.

6. A process as claimed in claim 3, wherein said tool is biased resiliently towards the conveyor axis.

7. A process as claimed in claim 1, wherein the carcass part is secured against displacement by means of piercing members.

8. A process as claimed in claim 7, which includes the step of temporarily releasing or repositioning the piercing members between successive steps of the process.

9. A process as claimed in claim 8 which includes the step of inverting a carcass part or turning it back to front in relation to the conveying direction.

10. A process as claimed in claim 1 which includes displacing an automatic tool into a working position to coincide with the arrival or presence of a carcass part, and displacing said tool out of said position at another time.

11. A process as claimed in any of claims 8, 9 or 10 which includes the use of a carcass section sensor in servo control relationship to the releasing, repositioning, inverting, turning or displacing means.

12. Apparatus for use in a continuous process of recovering meat from a plurality of animal carcass sections of the same type and approximately the same size, in particular severed animal heads, which apparatus comprises:
    (a) a powered mechanical conveyor having a moving track consisting of discrete links;
    (b) means for mounting a carcass section on the conveyor track comprising a plurality of spaced apart pivotally mounted piercing members and a plurality of spaced apart supporting members, said members being disposed on said conveyor as cooperating pairs; and,
    (c) at least one stationary automatic deboning tool mounted adjacent the conveyor track and adapted to engage the advancing carcass sections in succession,
    (d) each said tool being adapted to effect one stage of dissection of the carcass part.

13. A process for recovering meat from animal heads in particular swine heads which comprises applying a rotating tubular cutter to each head concentrically with each eyeball, prior to removal of the meat from the lateral aspects to the skull as left and right masks, whereby each mask is obtained with a circular perforation around the eye region, without attachment of eyeball or other viscera, and is fed to a derinder.

14. A process as claimed in claim 13, which comprises disposing the detached mask, rind side down, on a horizontal conveyor surface and conveying them to the derinder in an orientation wherein the leading edge has a substantially greater thickness of meat than of rind.

15. A process as claimed in claims 13 or 14, wherein each mask is threaded through the eye perforation onto a tractor pin upstanding from an edge region of a horizontal conveyor, and is drawn by the conveyor against a stationary knife so as to sever the ear therefrom.

16. A process as claimed in claim 13, wherein the masks are bisected after removal from the skull, to produce upper and lower semi-masks.

17. A process as claimed in claim 15, using an entire mask, and includes the steps of disposing the mask transversely on an edge region of the conveyor, with the ear projecting free of the conveyor, and using the couple exerted by the tractor pin and the knife, during severance of the ear, to reorient the mask with its leading edge (where the meat is thickest) facing the derinder.

18. A process as claimed in claim 15 which comprises deflecting the mask or semi-mask out of engagement with the tractor pin to allow it to enter the derinder, by stationary cam means located beside the conveyor.

19. Apparatus for performing the process claimed in claim 15, which comprises a horizontal belt or chain conveyor having a succession of upstanding tractor pins dipsosed around at least one of its edges.

20. Apparatus for deboning discrete, severed animal snouts, in particular swine snouts, which apparatus comprises means for receiving a severed swine snout by engagement of the anterior and lateral aspects without obstruction of the cut surface or of the dorsal or ventral aspects thereof, means for conveying the thus engaged snout in a direction and along a line extending from the dorsal surface to the ventral surface, and an immovable barrier member disposed along said line in the path of the advancing snout, the conveying force being sufficient to drive the fleshy parts of the snout onward leaving the bone immobilized behind the barrier member, the barrier member being so disposed and dimensioned as to pass cleanly through the snout receiving and conveying means without fouling.

21. Apparatus as claimed in claim 20 the snout receiving means is a receptacle of U-channel cross-section open at aboth ends (leading end and trailing end) wherein the trailing end has a reduced cross-section.

22. Apparatus as claimed in claim 21 wherein the transition between the greater and the lesser cross-section is marked by a step having a sharp forwardly directed edge.

23. Apparatus as claimed in claim 1, wherein the snout conveying means is a powered endless conveyor.

24. Apparatus as claimed in claims 21 or 23 wherein the conveyor has a plurality of the U-channel receptacles securely mounted on it, spaced apart in the conveying direction and with their channel mid-axes aligned on a common conveying locus.

25. Apparatus as claimed in claim 24, wherein the barrier member is an elongated parallelepipedal block mounted on a strudy anchorage and disposed with its main axis in line with the carrying locus.

* * * * *